(12) United States Patent
Feyereisen et al.

(10) Patent No.: US 8,140,260 B2
(45) Date of Patent: Mar. 20, 2012

(54) SYSTEM FOR ENHANCING A VEHICLE OPERATOR'S ORIENTATION AND ABILITY TO NAVIGATE

(75) Inventors: Thea L. Feyereisen, Hudson, WI (US); Troy Nichols, Peoria, AZ (US); John G. Suddreth, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 23 days.

(21) Appl. No.: 12/704,918

(22) Filed: Feb. 12, 2010

(65) Prior Publication Data

US 2011/0202272 A1    Aug. 18, 2011

(51) Int. Cl.
 *G01S 7/06* (2006.01)
(52) U.S. Cl. ............. 701/208; 701/10; 701/16; 701/211
(58) Field of Classification Search ................. 701/9–16, 701/207–213; 340/945, 953, 961
See application file for complete search history.

(56) References Cited

U.S. PATENT DOCUMENTS

| | | | |
|---|---|---|---|
| 5,089,816 A * | 2/1992 | Holmes, Jr. ............ | 340/995.26 |
| 5,751,576 A * | 5/1998 | Monson ............................ | 700/83 |
| 6,111,525 A | 8/2000 | Berlioz et al. | |
| 6,573,841 B2 | 6/2003 | Price | |
| 6,822,624 B2 | 11/2004 | Naimer et al. | |
| 7,257,469 B1 | 8/2007 | Pemble | |
| 7,268,702 B2 | 9/2007 | Chamas et al. | |
| 7,352,292 B2 | 4/2008 | Alter et al. | |
| 7,403,133 B2 | 7/2008 | He et al. | |
| 7,432,828 B2 | 10/2008 | He et al. | |
| 7,463,954 B1 | 12/2008 | He | |
| 7,505,835 B2 | 3/2009 | Brust et al. | |
| 2003/0023354 A1 | 1/2003 | Brust et al. | |
| 2007/0182590 A1 | 8/2007 | Younkin | |
| 2008/0262664 A1 | 10/2008 | Schnell et al. | |
| 2009/0231163 A1 | 9/2009 | He | |

OTHER PUBLICATIONS

EP Search Report, EP 11153462.4-1236 dated May 30, 2011.
EP Communication, EP 11153462.4-1236 dated Jun. 28, 2011.

* cited by examiner

*Primary Examiner* — Richard M. Camby
(74) *Attorney, Agent, or Firm* — Ingrassia Fisher & Lorenz, P.C.

(57) ABSTRACT

A system for enhancing a vehicle operator's orientation and ability to navigate a vehicle includes, but is not limited to, a display unit, a data storage unit, a position determining unit and a processor communicatively connected to the display unit, the data storage unit and the position determining unit. The processor is configured to obtain a position and heading of the vehicle from the position determining unit, to obtain terrain data from the data storage unit, and to control the display unit to display a three-dimensional representation of a terrain representative of an actual terrain proximate the vehicle. The processor controls the display unit to overlay a three-dimensional compass onto the three-dimensional representation of the terrain to display both the heading of the vehicle and the location of the vehicle with respect to the actual terrain.

20 Claims, 8 Drawing Sheets

SYSTEM FOR ENHANCING A VEHICLE OPERATOR'S ORIENTATION AND ABILITY TO NAVIGATE

TECHNICAL FIELD

The present invention generally relates to a system for enhancing a vehicle operator's orientation and ability to navigate a vehicle, and more particularly relates to a system and method for providing a vehicle operator with a three-dimensional graphical image that enhances the operator's orientation and ability to navigate the vehicle.

BACKGROUND

Vehicle operators frequently need to operate their vehicles in unfamiliar locations and/or in conditions of poor visibility. It is postulated that such unfamiliarity and poor visibility may disorient a vehicle operator and/or hamper the vehicle operator's ability to navigate the vehicle. For example, a pilot of an aircraft taxiing through an airport environment that is either unfamiliar to the pilot, or that is obscured by weather conditions, or both, may require some assistance in ascertaining the aircraft's orientation with respect to the terrain, including ramps, taxiways and runways, around the aircraft.

To address this issue, some systems have been devised to provide a vehicle operator with a three-dimensional display that graphically depicts the actual terrain (including runways, taxiways and ramps) around the vehicle. To further assist the vehicle operator, such systems also include a compass in the display that shows the vehicle's heading. However, such systems provide only a two-dimensional compass card overlaying the image of the environment. It is believed that vehicle operators may find it difficult to assimilate and utilize heading information provided by a two-dimensional compass card displayed in the midst of a three-dimensional display. For example, it is thought that a pilot may have difficulty correlating a compass heading depicted on the two-dimensional compass card with a route depicted three-dimensionally on a display screen. Additionally, some existing displays do not include a graphic indication of the location of the vehicle with respect to the depicted terrain. The present disclosure addresses these and other problems.

BRIEF SUMMARY

Various non-limiting embodiments of a system and method for enhancing a vehicle operator's orientation and ability to navigate a vehicle are disclosed herein. In a first non-limiting embodiment, the system includes, but is not limited to, a display unit that is configured to display three-dimensional graphical images. The system further includes a data storage unit that is configured to store terrain data relating to a plurality of geographical locations. The system further includes a position determining unit that is configured to determine a position and a heading of the vehicle. The system still further includes a processor that is communicatively connected to the display unit, to the data storage unit and to the position determining unit. The processor is configured to obtain the position and the heading of the vehicle from the position determining unit, to obtain a subset of the terrain data from the data storage unit, the subset corresponding to the position of the vehicle, and to control the display unit to display a three-dimensional representation of a terrain that is representative of an actual terrain proximate the vehicle. The processor is further configured to control the display unit to overlay a three-dimensional compass onto the three-dimensional representation of the terrain in a manner that depicts the heading of the vehicle. The three-dimensional compass is displayed at a location that is representative of the position of the vehicle with respect to the actual terrain.

In a second non-limiting embodiment, a system for enhancing a vehicle operator's orientation and ability to navigate a vehicle includes, but is not limited to, a display unit that is configured to display three-dimensional graphical images. The system further includes a data storage unit that is configured to store terrain data relating to a plurality of geographical locations. The system further includes a position determining unit that is configured to determine a position and a heading of the vehicle. The system further includes a communication unit that is configured to wirelessly receive a navigation signal. The system still further includes a processor that is communicatively connected to the display unit, to the data storage unit, to the position determining unit, and to the communication unit. The processor is configured to obtain the position and the heading of the vehicle from the position determining unit, to obtain a subset of the terrain data from the data storage unit, the subset corresponding to the position of the vehicle, and to control the display unit to display a three-dimensional representation of a terrain that is representative of an actual terrain proximate the vehicle. The processor is further configured to control the display unit to overlay a three-dimensional compass onto the three-dimensional representation of the terrain in a manner that depicts the heading of the vehicle, the three-dimensional representation of the compass being displayed at a location that is representative of the position of the vehicle with respect to the actual terrain. The communication unit is configured to provide the navigation signal to the processor and the processor is further configured to control the display unit to display navigation information corresponding to the navigation signal on the three-dimensional representation of the compass.

In a third embodiment, a method for enhancing a vehicle operator's orientation and ability to navigate a vehicle includes, but is not limited to, determining a position and heading of the vehicle, obtaining a subset of terrain data corresponding the position of the vehicle, and displaying a three-dimensional representation of a terrain that is representative of an actual terrain proximate the vehicle, and a three-dimensional compass overlaid onto the three-dimensional representation of the terrain in a manner that depicts the heading of the vehicle and that is representative of the position of the vehicle with respect to the actual terrain.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

The present disclosure includes a system and a method for enhancing a vehicle operator's orientation and ability to navigate a vehicle by providing the vehicle operator with a three-dimensional display of the environment around the vehicle, including terrain features, roads, ramps, runways, taxiways, and the like. The display will include a three-dimensional icon or graphical depiction of a compass overlaying the terrain. The three-dimensional compass will be displayed in a manner that identifies the location of the vehicle with respect to the environment around the vehicle. For instance, if the vehicle is actually located at an intersection of a ramp and a taxiway, the display will depict this by positioning the three-dimensional compass at the intersection of the depicted ramp and the depicted taxiway. By integrating the three-dimensional compass into the three-dimensional depiction of the environment around the vehicle, the vehicle operator is better able to assimilate heading information displayed on the three-dimensional compass and better able to correlate such information with the other three-dimensional images depicted on the display screen. The term "heading", used throughout this disclosure, should be understood to include the concept of "track" which refers to the direction of travel of certain vehicles, including helicopters and watercraft.

A further understanding of the embodiments of the system and method disclosed herein may be obtained through a review of the illustrations accompanying this application together with a review of the detailed description that follows.

Figure 1:
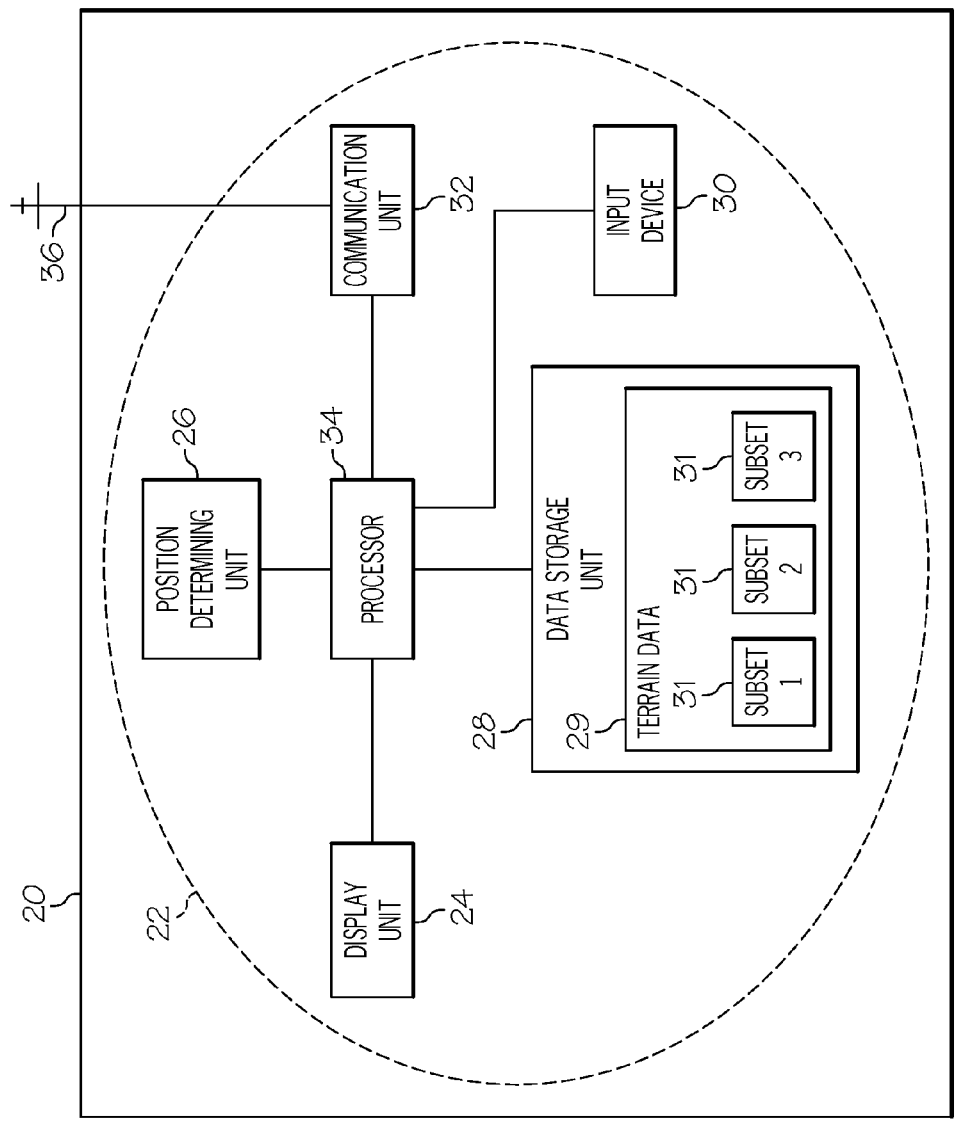
FIG. 1 is a schematic view illustrating a non-limiting embodiment of a system for enhancing a vehicle operator's orientation and ability to navigate a vehicle.

With respect to FIG. 1, a vehicle 20 is schematically illustrated. In the discussion contained herein, vehicle 20 is an aircraft. However, it should be understood that in other applications, vehicle 20 may be any type of vehicle including land-based vehicles, water craft, and space craft of any type and variety. Vehicle 20 is equipped with a non-limiting example of a system 22 for enhancing a vehicle operator's orientation and ability to navigate a vehicle. System 22 includes a display unit 24, a position determining unit 26, a data storage unit 28, an input device 30, a communication unit 32, and a processor 34. In other embodiments, system 22 may include additional components not described herein while in still other embodiments, fewer components may be utilized. In some embodiments, each of these components may be contained in a single housing, while in other embodiments, each component may be contained in either several collocated housings or housings which are located remotely from one another on board vehicle 20.

Display unit 24 may be any sort or type of display system that is configured to depict three-dimensional graphic images. In some embodiments, it may be desirable to select a display system that is also capable of displaying text. Some non-limiting examples of suitable display systems include a Cathode Ray Tube (CRT) display device, a flat panel display device, a Liquid Crystal Display (LCD) device, a thin film transistor (TFT) display device, a plasma display device, an electro-luminescent display device, a Light Emitting Diode (LED) display device, an Organic LED (OLED), a holographic display device such as a Heads Up Display (HUD), a Micro Mirror Device (MMD) display device, or the like. Additionally, the schematically represented display unit 24 may include multiple individual display screens communicatively connected or otherwise configured to cooperate with one another. An example of a suitable display unit 24 would include any type of synthetic vision system display such as an integrated primary flight display. Synthetic vision system displays are known in the art and are frequently configured to provide aircraft operators with three-dimensional depictions of terrain around the aircraft and to present text and symbology over such three-dimensional depictions. Other suitable displays may include near to eye displays worn by pilots and configured to present images on a screen, lens or projector disposed proximate to the pilot's eye. In still other embodiments, display unit 24 may comprise a HUD. In some embodiments, display unit 24 may be dedicated for use exclusively with system 22 while in other embodiments display unit 24 may be shared with other systems on board vehicle 20.

In the illustrated embodiment, position determining unit 26 is configured to detect and/or to determine the position of vehicle 20 with respect to the earth (e.g. latitude and longitude coordinates) as well as the heading of vehicle 20 and, in some examples, the altitude of vehicle 20. In some non-limiting embodiments, position determining unit 26 may be a single integrated unit such as, but not limited to, a global positioning system (GPS) navigation system or an inertial navigation system. In other non-limiting embodiments, position determining unit 26 may comprise a plurality of discrete systems, each providing one or more items of information pertaining to the location of vehicle 20, which may be aggregated together to arrive at the location, the altitude, and the heading of vehicle 20. In some embodiments, position determining unit 26 may be configured to determine the position of vehicle 20 at regular time intervals while in other embodiments, position determining unit 26 may be configured to determine the position of vehicle 20 only in response to an interrogation made by another onboard system for such location information. In still other embodiments, position determining unit 26 may be configured to determine the position of vehicle 20 both at regular intervals and also in response to an interrogation received from other onboard systems. In some embodiments, position determining unit 26 may be dedicated for use exclusively with system 22 while in other embodiments, position determining unit 26 may be shared with other systems on board vehicle 20.

In the illustrated embodiment, data storage unit 28 is an electronic memory device that is configured to store data. Data storage unit 28 may be any type of data storage component including, without limitation, non-volatile memory, disk drives, tape drives, and mass storage devices and may include any suitable software, algorithms and/or sub-routines that provide the data storage component with the capability to store, organize, and permit retrieval of data. In the illustrated embodiment, data storage unit 28 is configured to store data relating to the terrain (terrain data 29) at each of a plurality of airports. In some embodiments, terrain data 29 may include, without limitation, the location of runways, taxiways, gates and ramps at each respective airport. The terrain data may also include the location of specific topographical features, landmarks and structures at each respective airport. In some embodiments, the terrain data may be organized and/or arranged into multiple discrete subsets 31, each subset containing data relating to a specific airport or other geographic location. In some embodiments, data storage unit 28 may be dedicated for use exclusively with system 22 while in other embodiments, data storage unit 28 may be shared with other systems on board vehicle 20.

Input device 30 may be any component suitable to receive inputs from the operator of vehicle 20. For example, and without limitation, input device 30 may be a keyboard, a mouse, a touch screen, a tablet and stylus, a button, a switch, a knob, a slide, a microphone, a camera, a motion detector, or any other device that is configured to permit a human to provide inputs into an electronic system. In other embodiments, input device 30 may be a self contained or independent system, such as a flight management system, that is, itself, configured to receive inputs from the operator of vehicle 20 and which, as part of its functioning, provides outputs which are received as inputs by input device 30. In some embodiments, input device 30 may be dedicated for use exclusively with system 22 while in other embodiments input device 30 may be shared with other systems on board vehicle 20.

Communication unit 32 may be any type of communication device that is configured to receive wireless communications. Communication unit 32 may be configured to receive satellite communication transmissions, microwave transmissions or any other type of RF transmissions. Communication unit 32 cooperates with an antenna 36 to detect and receive such wireless communication signals. Communication unit 32 may include associated electronics to process the received signals. In the illustrated example, communication unit 32 is configured to receive data link transmissions from tower controllers. In some embodiments, communication unit 32 may be dedicated for use exclusively with system 22 while in other embodiments communication unit 32 may be shared with other systems on board vehicle 20.

Processor 34 may be any type of onboard computer, computer system, or microprocessor that is configured to perform algorithms, to execute software applications, to execute subroutines and/or to be loaded with and to execute any other type of computer program. Processor 34 may comprise a single processor or a plurality of processors acting in concert. In some embodiments, processor 34 may be dedicated for use exclusively with system 22 while in other embodiments processor 34 may be shared with other systems on board vehicle 20.

Processor 34 is communicatively connected to display unit 24, position determining unit 26, data storage unit 28, input device 30 and communication unit 32. Such connection may be effected through the use of any suitable means of transmission including both wired and wireless connections. For example, each component may be physically connected to processor 34 via a coaxial cable or via any other type of wire connection effective to convey signals. In the illustrated embodiment, processor 34 is directly communicatively connected to each of the other components. In other embodiments, each component may be communicatively connected to processor 34 across a vehicle bus. In still other examples, each component may be wirelessly connected to processor 34 via a Bluetooth connection, a WiFi connection or the like.

Being communicatively connected provides a pathway for the transmission of commands, instructions, interrogations and other signals between processor 34 and each of the other components. Through this communicative connection, processor 34 may control and/or communicate with each of the other components. Each of the other components discussed above may be configured to interface and engage with processor 34. For example, in some embodiments, display unit 24 may be configured to receive commands from processor 34 and to display graphical images in response to such commands. In some embodiments, position determining unit 26 may be configured to automatically provide position information to processor 34 at regular intervals while in other embodiments, position determining unit 26 may be configured to provide position information to processor 34 in response to an interrogation received from processor 34. In some embodiments, data storage unit 28 may be configured to receive interrogations from processor 34 and to retrieve and provide data, including one or more subsets 31 to processor 34 in response to such interrogations. In some embodiments, input device 30 may be configured to convert operator actions and/or movements into electronic signals and to communicate such signals to processor 34. And in some embodiments, communication unit 32 may be configured to automatically provide communication signals received through antenna 36 to processor 34 while in other embodiments communication unit 32 may be configured to store such signals and to provide such signals to processor 34 in response to an interrogation from processor 34 for such signals.

Processor 34 is configured to interact with, coordinate and/or orchestrate the activities of each of the other components of system 22 for the purpose of enhancing the operator's orientation and ability to navigate vehicle 20. Processor 34 may be programmed and/or otherwise configured to obtain the position and heading of vehicle 20 from position determining unit 26. In some embodiments, processor 34 may be configured to periodically and automatically interrogate position determining unit 26 for the position and heading information while in other embodiments, processor 34 may be configured to receive position and heading information transmissions that are sent periodically and automatically by position determining unit 26.

Processor 34 may be further configured to obtain subset 31 of terrain data 29 relating to the current position and heading of vehicle 20 from data storage unit 28. As set forth above, this data can include, but is not limited to, information about the location of the taxiways, runways, ramps, gates, structures, landmarks and topographical features at the airport where vehicle 20 is presently located.

Utilizing both the position and heading info obtained from position determining unit 26 and subset 31 obtained from data storage unit 28, processor 34 may be further configured to control display unit 24 to render and display a three-dimensional image or map of the terrain in the vicinity of vehicle 20. Such image may contain the various pathways and features contained in subset 31 of terrain data 29. In some embodiments, the image presented on display unit 24 may be representative of the view a pilot may see from the cockpit window such that the pilot can correlate items displayed on display unit 24 with what is visible through the window. As vehicle 20 moves or changes direction, the new position and heading are detected by position determining unit 26, such position and heading information being obtained by processor 34 which, in turn, is configured to transmit new instructions to display unit 24 to display a new image to the pilot. In this manner, as vehicle 20 moves, the image depicted on display unit 24 is updated to reflect the new position and heading of vehicle 20.

Figure 2:
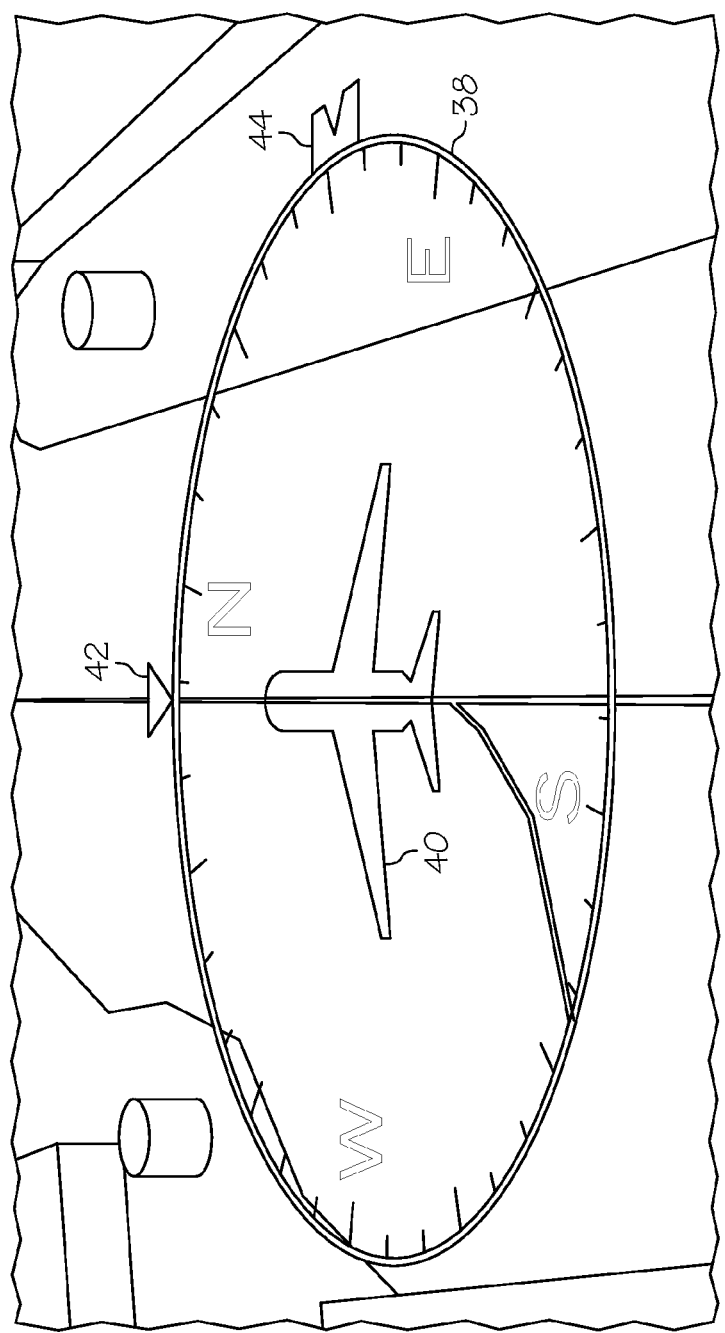
FIGS. 2-7 are perspective views illustrating exemplary three-dimensional displays rendered by the system of FIG. 1 to demonstrate various aspects of the system of FIG. 1.

As illustrated in FIG. 2, processor 34 is further configured to control display unit 24 to project a three-dimensional compass 38 onto the terrain that is depicted on display unit 24. Three-dimensional compass 38 is depicted in an exocentric fashion and is shown from a point of view of above, and slightly to the rear of, three-dimensional compass 38. As used herein, the term "exocentric" refers to a third person perspective, i.e., looking at three-dimensional compass 38 from a distance rather than from a point of view originating within three dimensional compass 38. This perspective may assist a pilot in assimilating the information presented by three-dimensional compass 38. In other embodiments, either an egocentric perspective or a different point of view may be depicted without departing from the teachings of the present disclosure.

Processor 34 may be further configured to control display unit 24 to depict three-dimensional compass 38 in a location relative to the depicted terrain that corresponds to the actual location of vehicle 20 relative to the actual terrain in the vicinity of vehicle 20. In some embodiments, three-dimensional compass 38 may be centered over the current position of aircraft 20. In other embodiments, a vehicle icon 40 may be included with three-dimensional compass 38 to further communicate to the pilot the precise location of vehicle 20 with respect to the terrain. In still other embodiments, both three-dimensional compass 38 and vehicle icon 40 may be centered over the current position of vehicle 20. Such a depiction may greatly enhance a pilot's orientation and ability to navigate vehicle 20 at an unfamiliar airport.

In the illustrated embodiment, three-dimensional compass 38 includes only cardinal directions (i.e., north, south, east and west). Such a presentation may avoid cluttering the image. In other embodiments, a greater number of directions and/or headings may also be displayed without departing from the teachings of the present disclosure. In still other embodiments, the appearance of three-dimensional compass 38 may change during operation of vehicle 20 depending upon its location. For instance, in one embodiment, three-dimensional compass 38 may include only cardinal directions while vehicle 20 is on the ground and may include additional directions while vehicle 20 is airborne.

As illustrated in FIG. 2, three-dimensional compass 38 includes a current vehicle heading indicator 42. In the embodiment illustrated in FIG. 2, current vehicle heading indicator 42 is a small triangular icon disposed around an outer perimeter of three-dimensional compass 38 at a location that corresponds with the current heading of vehicle 20. As illustrated, current vehicle heading indicator 42 indicates that vehicle 20 is on a heading of approximately 350 degrees. In other embodiments, other icons may be utilized to communicate heading information to the pilot without departing from the teachings of the present disclosure.

Also illustrated in FIG. 2 is a desired vehicle heading indicator 44. A pilot may utilize input device 30 to position desired vehicle heading indicator 44 at any desired location around three-dimensional compass 38. For example, if input device 30 is a knob, then when the pilot turns the knob, input device 30 converts the pilot's input into an electronic signal which is communicated to processor 34. Processor 34 is configured to control display unit 24 to display desired vehicle heading indicator 44 around an outside of three-dimensional compass 38 and to move desired vehicle heading indicator 44 in a direction and by an amount that corresponds to the pilot's rotation of the knob. In other embodiments, desired vehicle heading indicator 44 may be displayed around an inside of a perimeter of three-dimensional compass 38, or in any other suitable location without departing from the teachings of the present disclosure. Once aligned with a desired heading, desired vehicle heading indicator 44 will remain aligned with that heading until further inputs are received through input device 30. In this manner, desired vehicle heading indicator 44 may assist a pilot in placing his aircraft on a desired heading by allowing the pilot to watch current vehicle heading indicator 42 as it moves around three-dimensional compass 38 and by straightening out the aircraft once the two indicators are in alignment.

Figure 3:
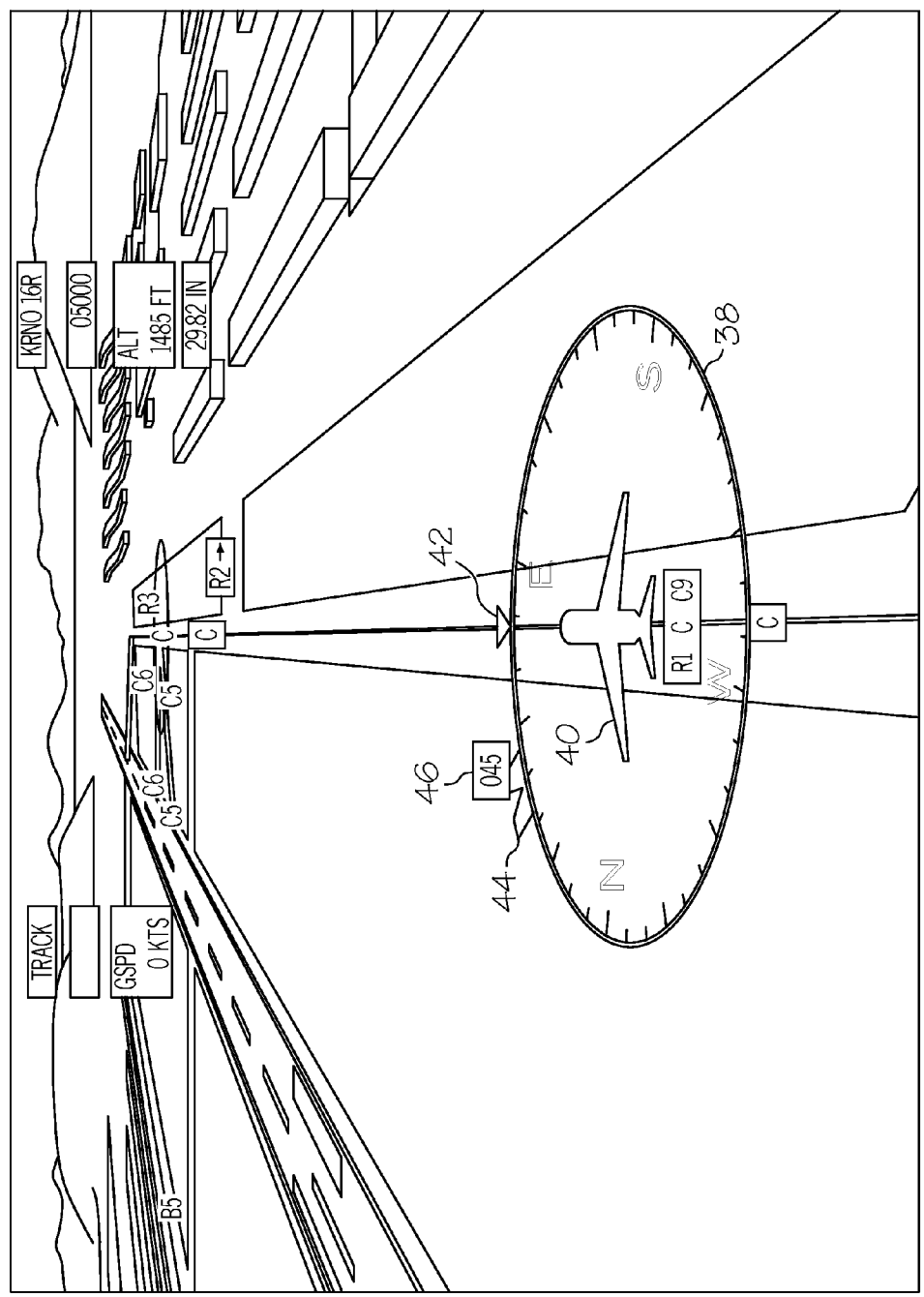
Figure 4:
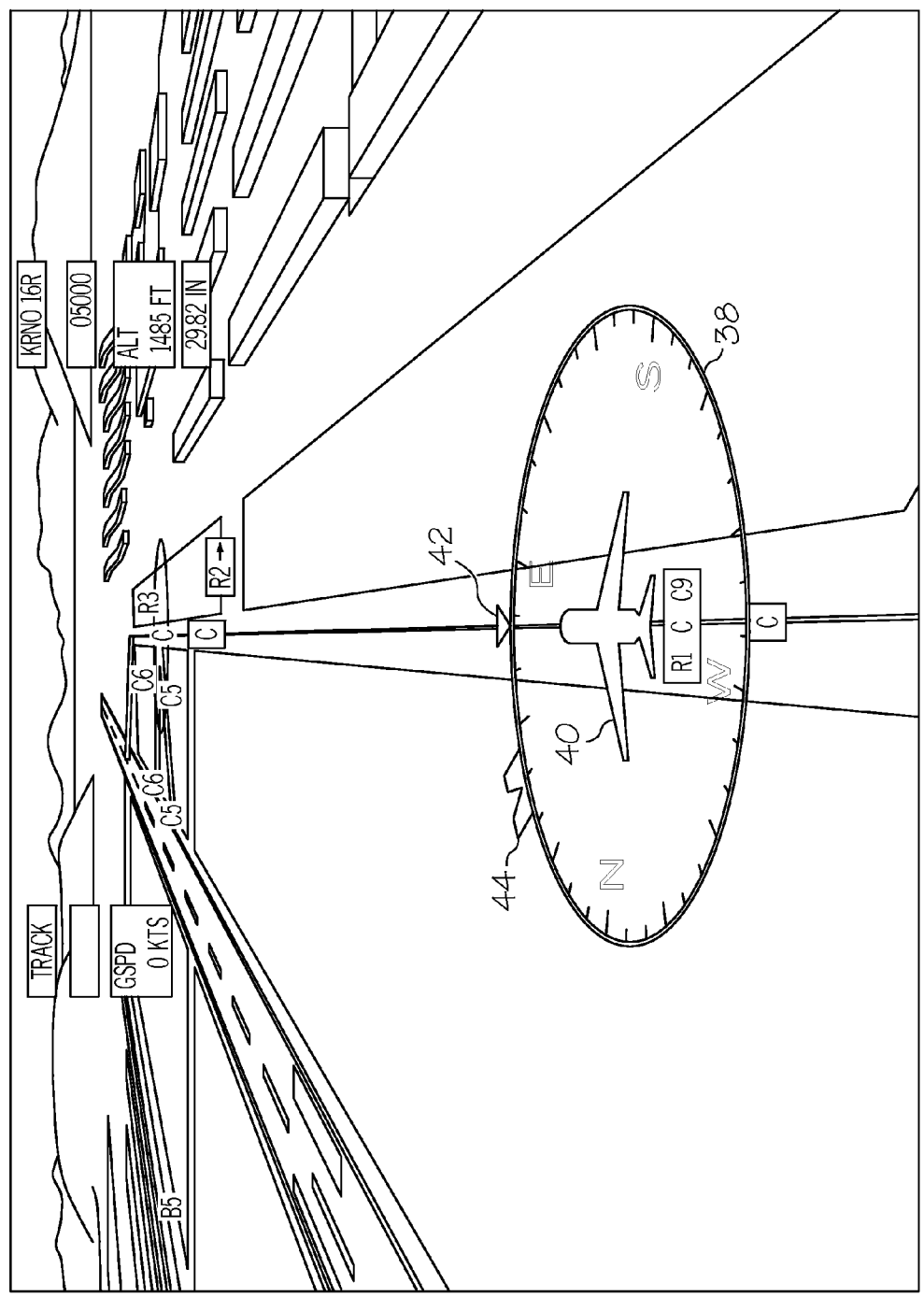

In some embodiments, processor 34 may be configured to control display unit 24 to depict a readout window 46. This is illustrated in FIG. 3. Readout window 46 contains the heading with which desired vehicle heading indicator 44 is aligned. Thus, using the example above, as the pilot turns the knob and as desired vehicle heading indicator 44 rotates around three-dimensional compass 38, readout window 46 will contain a changing readout that corresponds with the various compass headings passed by desired vehicle heading indicator 44. This feature may allow pilots to more precisely align desired vehicle heading indicator 44 with a desired heading. As illustrated in FIG. 4, in some embodiments, processor 34 may be configured to control display unit 24 to discontinue its display of readout window 46 after a predetermined period of time. In this manner, image clutter may be reduced.

Figure 5:
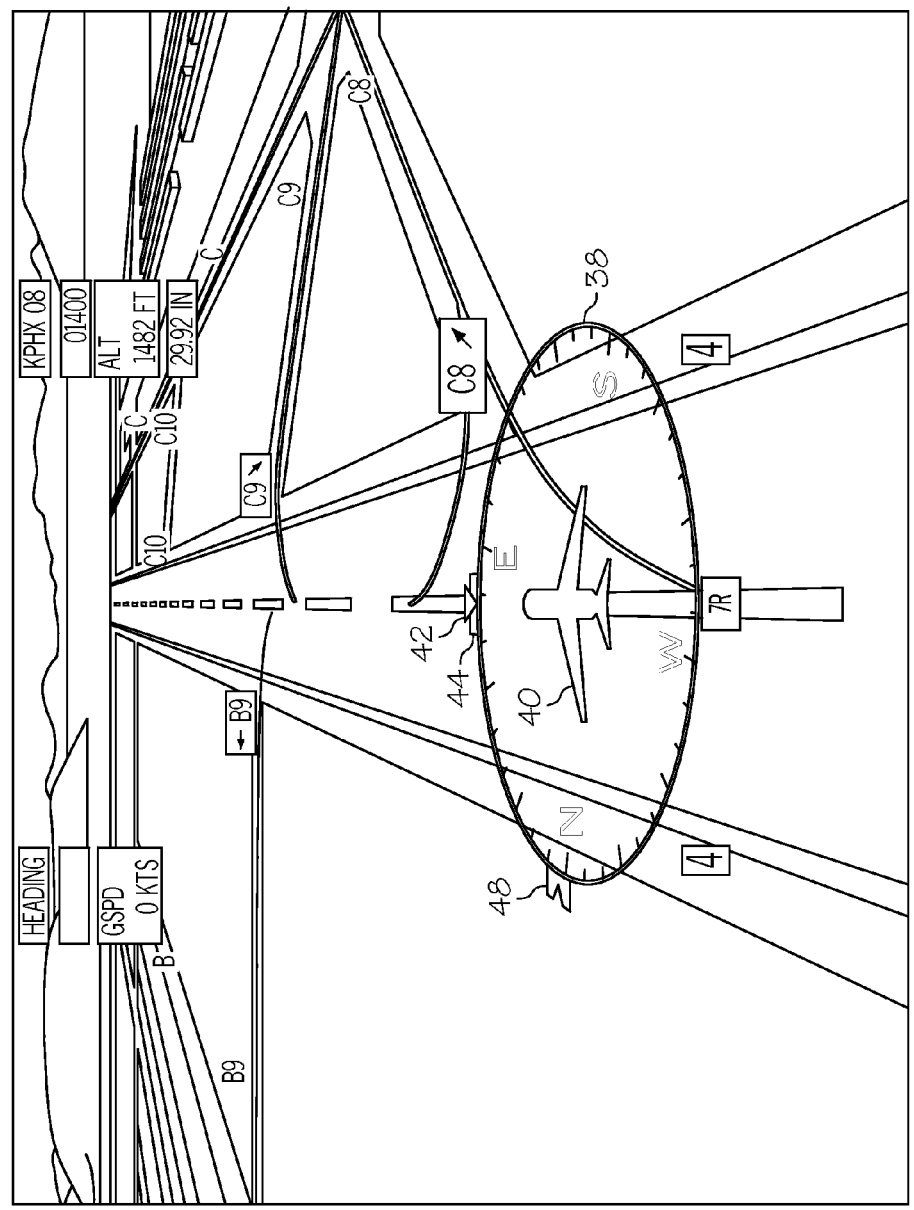
Figure 6:
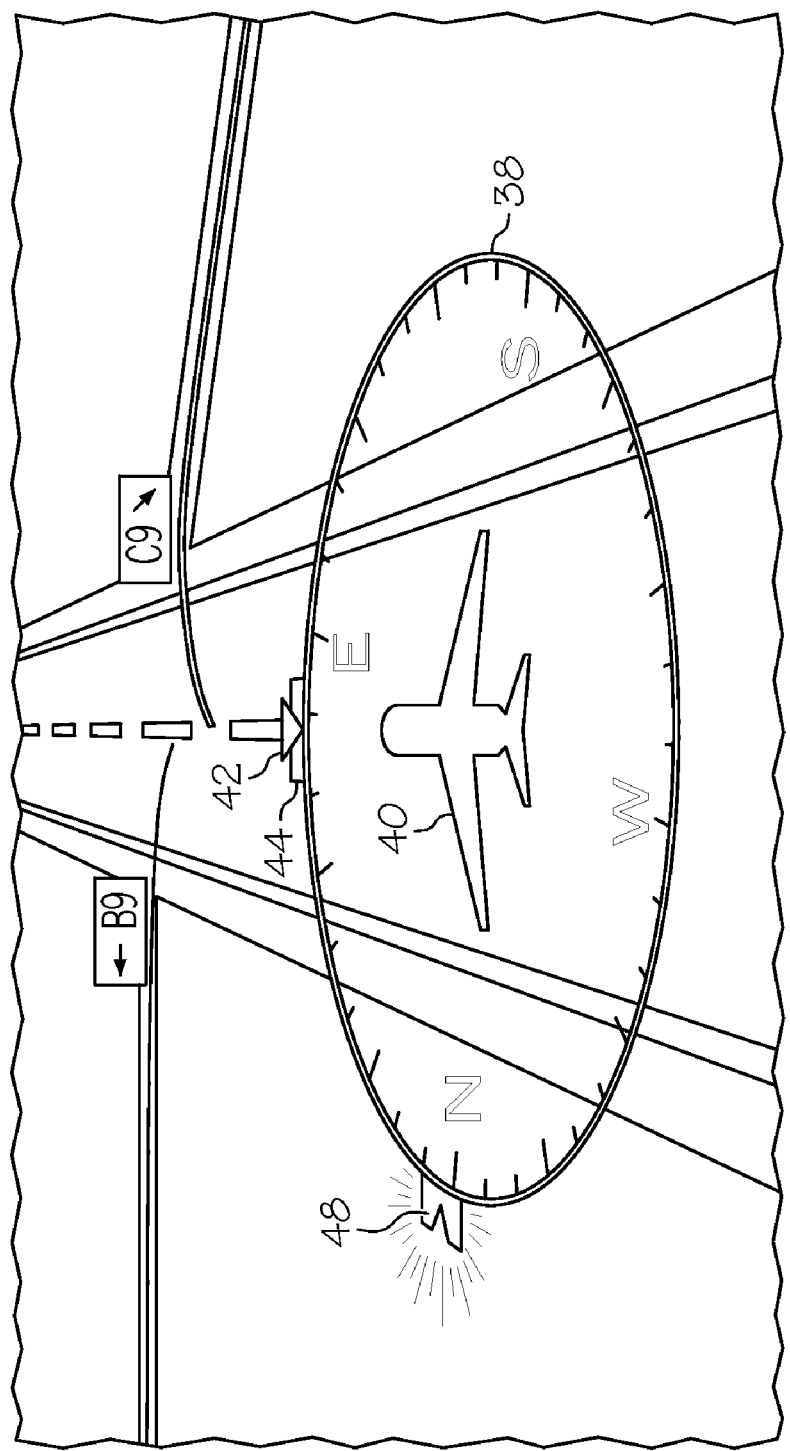

Another feature of the present disclosure is illustrated in FIGS. 5 and 6. At some airports, a controller pilot data link (CPDL) is utilized to communicate aircraft control instructions from a tower controller to a pilot. A CPDL is a means of wireless communication between a tower controller and a pilot and is used to send navigation signals (signals containing navigation related instructions such as a controller directed vehicle heading) to the pilot. For example, if a tower controller wants an aircraft to turn left onto a particular taxiway and to taxi along that taxiway to a particular runway, rather than use a radio to speak with the pilot, the tower controller may simply send a navigation signal containing taxi instructions to the pilot over the CPDL. The navigation signal is sent wirelessly by the tower controller and is received by vehicle 20 via antenna 36 and communication unit 32. Communication unit 32 may then provide the navigation instructions embedded within the navigation signal to processor 34 which, in turn, controls display unit 24 to display a controller directed vehicle heading indicator 48 on three-dimensional compass 38 at a heading that corresponds to the heading directed by the tower controller. In some embodiments, differing colors may be used to help the pilot discern between controller directed vehicle heading indicator 48 and desired vehicle heading indicator 44.

With respect to FIGS. 5 and 6, in some embodiments, controller directed vehicle heading indicator 48 may blink, flash, strobe, pulse, change color, visually vibrate or otherwise change in appearance as vehicle 20 approaches a position where a change in course has been directed by the tower controller. For example, if a tower controller transmits a signal over the CPDL that directs vehicle 20 to turn left to a heading of approximately 350 degrees at waypoint B9, processor 34 will control display unit 24 to depict controller directed vehicle heading indicator 48 in alignment with heading 350 on three-dimensional compass 38. Then, as indicated in FIG. 6, as vehicle 20 approaches waypoint B9, controller directed vehicle heading indicator 48 begins to flash and will stop flashing once vehicle 20 is heading 350 degrees. In some embodiments, once the directed change in heading has been completed, controller directed vehicle heading indicator 48 may fade away or may change color and a new controller directed vehicle heading indicator 48 may be displayed to indicate the next controller directed change of heading.

In another variation of this embodiment, the navigation signal sent through the CPDL may deliver the navigation instructions to a readout available to the pilot in the cockpit of the aircraft. The pilot who may then enter the navigation instruction into system 22 using input device 30 or another input device. As with the automatic method discussed above, this series of actions will also result in the appearance of controller directed vehicle heading indicator 48 on three-dimensional compass 38 at a heading that corresponds to the heading directed by the tower controller.

In a further variation of this embodiment, controller directed vehicle heading indicator 48 may be positioned on three dimensional compass 38 such that it constantly points in the direction that the aircraft should proceed in. For example, and with continued reference to FIG. 5, if the navigation instructions require that the aircraft is to make a left turn at B9 and follow a heading of 350, then controller directed vehicle heading indicator 48 would be positioned at the 080 heading on three dimensional compass 38 as the aircraft travels towards B9. As the aircraft approaches B9, controller directed vehicle heading indicator 48 will begin to move about the circumference of three dimensional compass 38 towards a heading of 350. When the aircraft reaches B9, controller directed vehicle heading indicator 48 will be positioned at a heading of 350. In this manner, controller directed vehicle heading indicator 48 can provide real time guidance to the pilot which may be used to guide the movement of the aircraft.

In a further variation, controller directed vehicle heading indicator 48 can instantaneously move from a straight forward direction to the direction of the aircraft's next turn once there are no other pathways for the aircraft to follow. For example, and with continued reference to FIG. 5, if the navigation instructions require that the aircraft is to make a right turn at C10, then the controller directed vehicle heading indicator 48 will point straight ahead in the 080 direction until the aircraft passes the intersection with B9/C9. Once the aircraft passes this intersection, then controller directed vehicle heading indicator 48 can instantly move to a heading of 170 which would be reflective of the right turn the aircraft would have to make to follow C10.

Figure 7:
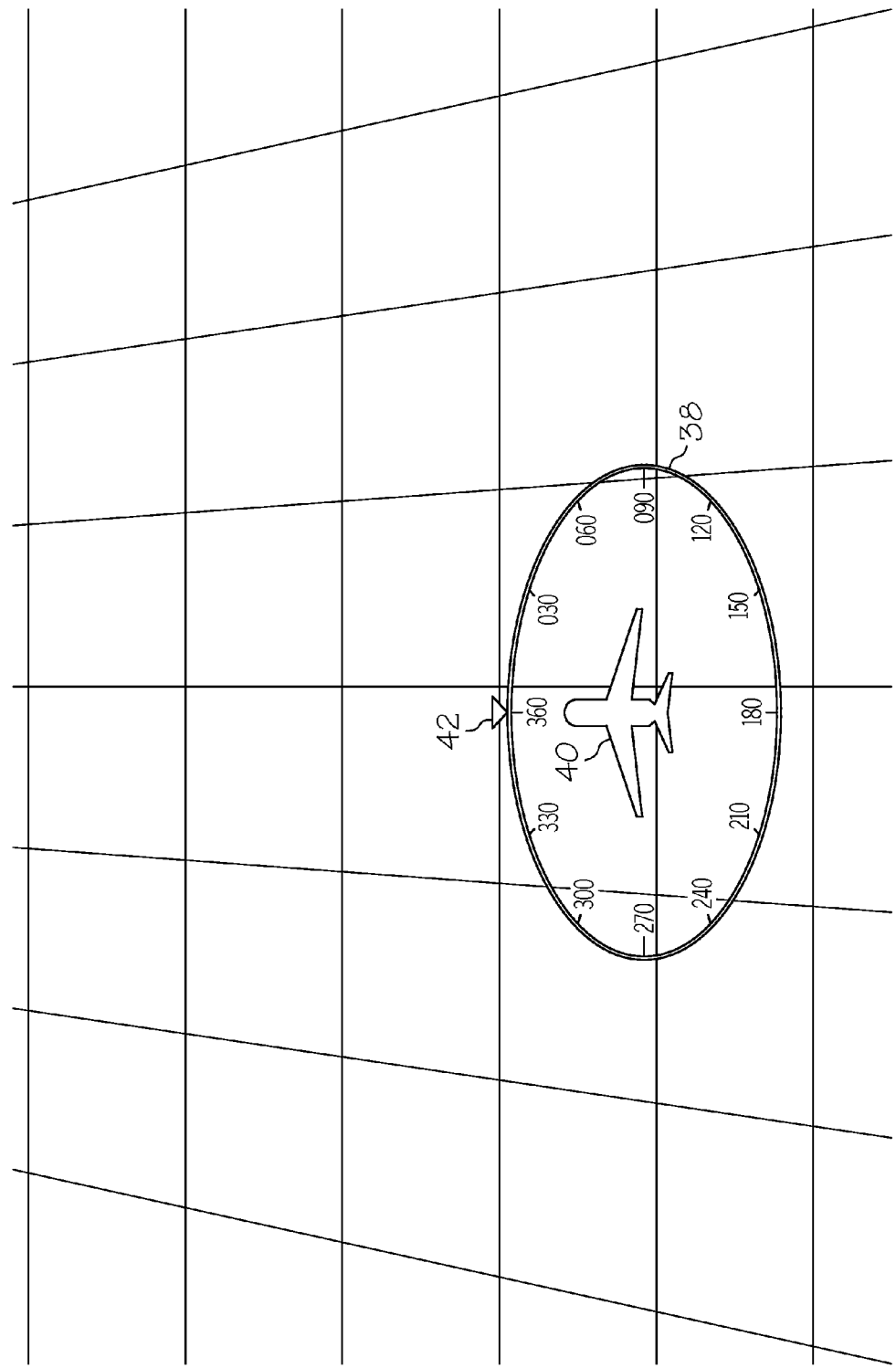

With respect to FIG. 7, an embodiment of system 22 is illustrated which changes the appearance of three-dimensional compass 38 while vehicle 20 is in flight. In FIG. 7, vehicle 20 is airborne and, as illustrated, three-dimensional compass 38 includes multiple compass headings rather than merely including cardinal headings.

In other embodiments, system 22 may be utilized by tower controllers, air traffic controllers, remote vehicle operators, and a wide variety of other entities other than the pilot, to display the positions of a single or multiple aircraft. In such embodiments, the headings displayed on three dimensional compass 38 may be reduced or eliminated entirely to avoid clutter. Further, the three dimensional compasses 38 displayed in such an embodiment could include a prominently displayed current vehicle heading indicator 42 and/or a prominently displayed controller directed vehicle heading indicator 48. Such embodiments would include communication unit 32 to receive relevant data from each aircraft being controlled.

Figure 8:
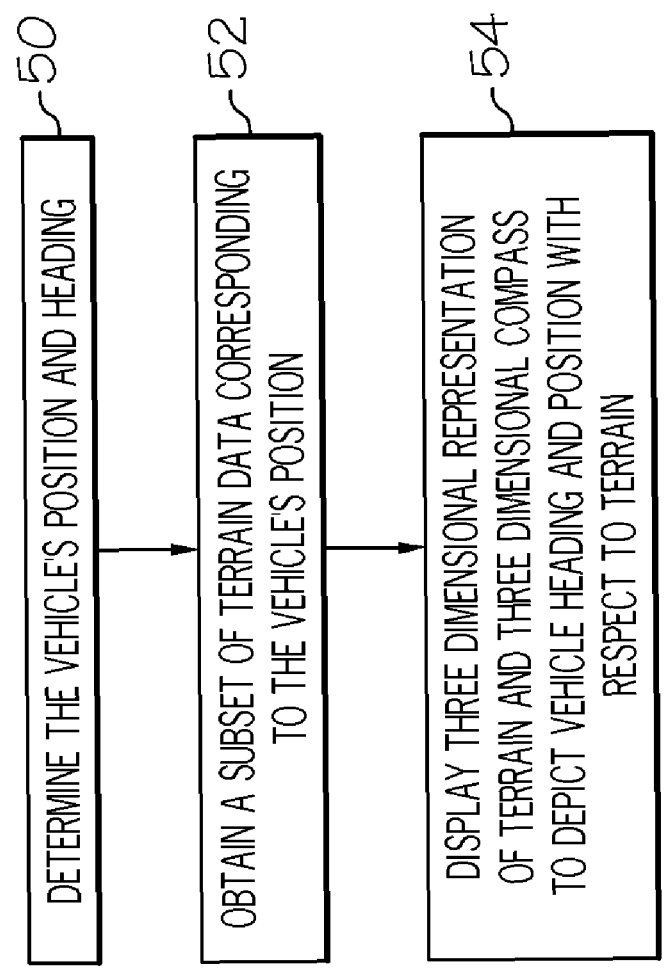
FIG. 8 is a block diagram illustrating the steps of a non-limiting example of a method for enhancing a vehicle operator's orientation and ability to navigate a vehicle.

With respect to FIG. 8, a non-limiting example of a method for enhancing a vehicle operator's orientation and ability to navigate vehicle 20 is illustrated. At block 50, The vehicle's position and heading is determined. This may be accomplished through the use of a position determining unit such as position determining unit 26 or through any other suitable means.

At block 52, a subset of terrain data is obtained by a processor such as processor 34. The subset of terrain data corresponds to the current position of vehicle 20 and includes information such as, but not limited to, roads, runways, taxiways, ramps, gates, landmarks and topographical features in the vicinity of vehicle 20.

At block 54, a three-dimensional representation of the terrain in the vicinity of vehicle 20 is displayed. A three-dimensional compass is included in the display in a manner that depicts the heading and the position of vehicle 20 with respect to the terrain in the vicinity of vehicle 20.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for enhancing a vehicle operator's orientation and ability to navigate a vehicle, the system comprising:
a display unit configured to display three-dimensional graphical images;
a data storage unit configured to store terrain data relating to a plurality of geographical locations;
a position determining unit configured to determine a position and a heading of the vehicle; and
a processor communicatively connected to the display unit, to the data storage unit and to the position determining unit, the processor configured to obtain the position and the heading of the vehicle from the position determining unit, to obtain a subset of the terrain data from the data storage unit, the subset corresponding to the position of the vehicle, and to control the display unit to display a three-dimensional representation of a terrain that is representative of an actual terrain proximate the vehicle, the processor being further configured to control the display unit to overlay a three-dimensional compass onto the three-dimensional representation of the terrain in a manner that depicts the heading of the vehicle, the three-dimensional compass being displayed at a location that is representative of the position of the vehicle with respect to the actual terrain.

2. The system of claim 1, wherein the processor is further configured to control the display unit to display the three-dimensional compass centered over the location that is representative of the position of the vehicle with respect to the actual terrain.

3. The system of claim 1, wherein the processor is further configured to control the display unit to display a vehicle icon at an approximate center of the three-dimensional compass, the vehicle icon being centered over the location that is representative of the position of the vehicle with respect to the actual terrain.

4. The system of claim 1, wherein the processor is further configured to control the display unit to display the three-dimensional compass in an exocentric manner.

5. The system of claim 4, wherein the processor is further configured to control the display unit to display the three-dimensional compass from a point of view that is above and behind the three-dimensional compass.

6. The system of claim 1, wherein the processor is further configured to control the display unit to display a current vehicle heading indicator on the three-dimensional compass.

7. The system of claim 1, further comprising an input device communicatively connected to the processor, the input device configured to receive an input from a user and to provide the input to the processor, wherein the processor is further configured to control the display unit to display a desired vehicle heading indicator on the three-dimensional compass at a heading corresponding to the input.

8. The system of claim 7, wherein the processor is further configured to control the display unit to temporarily display a read-out window proximate the desired vehicle heading indicator and to display a heading in the read-out window corresponding to a position of the desired vehicle heading indicator on the three-dimensional compass.

9. The system of claim 1, wherein the processor is further configured to control the display unit to display the three-dimensional compass to include only cardinal directions while the vehicle is on a ground surface and to display both cardinal directions and intermediate headings while the vehicle is in flight.

10. A system for enhancing a vehicle operator's orientation and ability to navigate a vehicle, the system comprising:
- a display unit configured to display three-dimensional graphical images;
- a data storage unit configured to store terrain data relating to a plurality of geographical locations;
- a position determining unit configured to determine a position and a heading of the vehicle;
- a communication unit configured to wirelessly receive a navigation signal; and
- a processor communicatively connected to the display unit, to the data storage unit, to the position determining unit, and to the communication unit, the processor configured to obtain the position and the heading of the vehicle from the position determining unit, to obtain a subset of the terrain data from the data storage unit, the subset corresponding to the position of the vehicle, and to control the display unit to display a three-dimensional representation of a terrain that is representative of an actual terrain proximate the vehicle, the processor being further configured to control the display unit to overlay a three-dimensional compass onto the three-dimensional representation of the terrain in a manner that depicts the heading of the vehicle, the three-dimensional compass being displayed at a location that is representative of the position of the vehicle with respect to the actual terrain, the communication unit being configured to provide the navigation signal to the processor, and the processor being further configured to control the display unit to display navigation information corresponding to the navigation signal on the three-dimensional compass.

11. The system of claim 10, wherein the navigation signal contains a controller directed vehicle heading and wherein the processor is further configured to control the display unit to display a controller directed vehicle heading indicator on the three-dimensional compass at a heading that corresponds with the controller directed vehicle heading.

12. The system of claim 11, wherein the processor is further configured to control the display unit to display a current vehicle heading indicator on the three-dimensional compass in a first color and to display the controller directed vehicle heading indicator in a second color.

13. The system of claim 11, wherein the processor is further configured to control the display unit to flash the controller directed vehicle heading indicator when the vehicle approaches a location where the vehicle is directed to change heading to the controller directed vehicle heading.

14. The system of claim 10, wherein the processor is further configured to control the display unit to display the three-dimensional compass centered over the location that is representative of the position of the vehicle with respect to the actual terrain.

15. The system of claim 10, wherein the processor is further configured to control the display unit to display a vehicle icon at an approximate center of the three-dimensional compass, the vehicle icon being centered over the location that is representative of the position of the vehicle with respect to the actual terrain.

16. The system of claim 10, wherein the processor is further configured to control the display unit to display the three-dimensional compass in an exocentric manner.

17. The system of claim 16, wherein the processor is further configured to control the display unit to display the three-dimensional compass from a point of view that is above and behind the three-dimensional compass.

18. The system of claim 10, further comprising an input device communicatively connected to the processor, the input device configured to receive an input from a user and to provide the input to the processor, wherein the processor is further configured to control the display unit to display a desired vehicle heading indicator on the three-dimensional compass at a heading corresponding to the input.

19. The system of claim 18, wherein the processor is further configured to control the display unit to display a read-out window proximate the desired vehicle heading indicator and to display a heading in the read-out window corresponding to a position of the desired vehicle heading indicator on the three-dimensional compass.

20. A method for enhancing a vehicle operator's orientation and ability to navigate a vehicle, the method comprising the steps of:
- determining a position and heading of the vehicle;
- obtaining a subset of terrain data corresponding the position of the vehicle; and
- displaying a three-dimensional representation of a terrain that is representative of an actual terrain proximate the vehicle and a three-dimensional compass overlaid onto the three-dimensional representation of the terrain in a manner that depicts the heading of the vehicle and that is representative of the position of the vehicle with respect to the actual terrain.

* * * * *